March 13, 1928. 1,662,652

E. B. ZIMMER

ELECTRIC TOASTER

Filed March 24, 1925  2 Sheets-Sheet 1

Inventor
Ernest B. Zimmer
By Bates Macklin Goldrick & Teare
Attorney

March 13, 1928.                    E. B. ZIMMER                    1,662,652
                                 ELECTRIC TOASTER
                            Filed March 24, 1925           2 Sheets-Sheet 2

Inventor
Ernest B. Zimmer
By Bates, Macklin, Goldrick & Teare
Attorneys

Patented Mar. 13, 1928.

1,662,652

UNITED STATES PATENT OFFICE.

ERNEST B. ZIMMER, OF CLEVELAND, OHIO, ASSIGNOR TO LIBERTY GAUGE & INSTRU-
MENT COMPANY, OF CLEVELAND, OHIO, A CORPORATION OF OHIO.

ELECTRIC TOASTER.

Application filed March 24, 1925. Serial No. 17,911.

This invention relates to electric heaters and more particularly to the construction of electric bread toasters. Heretofore electric toasters have been constructed with a tiltable bread rack for enabling the bread to be reversed during the toasting operation. Most of the toasters embodying this construction comprise an upright frame having a pivoted door which is arranged to be moved outwardly from a heating element which is disposed at the mid-portion of the frame. This construction necessarily increases the cost of manufacture, particularly in the assembly operation, and increases the difficulty of keeping the toaster clean.

A further problem in the construction of electric toasters is the arrangement of a heating element which can be replaced without requiring the entire toaster to be dismantled. Accordingly, the present invention is concerned with an improved construction of heating element which permits the element to be assembled independently of the frame and to be inserted in position in an expeditious manner.

Further objects of my invention are the attainment of an electric toaster which is so constructed that the bread may be quickly and easily removed from the rack and reversed without necessitating the use of levers, links and other connecting members.

I carry out the above objects by employing a toaster frame which comprises upright end members together with a connecting base and top member. The frame supports a stationary upright bread rack and a stationary bread rest or shelf near the bottom of the rack so that bread may be placed directly against the rack and be adequately supported for the toasting operation. The bottom of the rack terminates above the shelf wherefore the bread may be reversed merely by exerting pressure thereon in the region adjacent the space between the rack and the shelf. This causes the bread to tip away from the element and to fall into the hand of the operator, whereupon the bread may be quickly turned and replaced on the rack. After a few trials one can become skilled in quickly reversing the bread without danger of burning the fingers.

Figure 1:
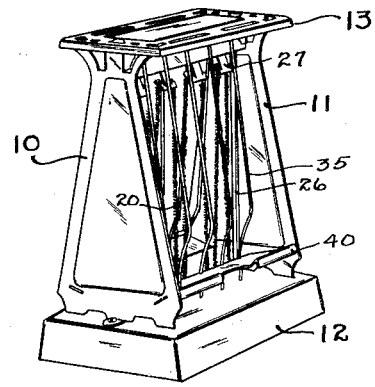
Figure 2:
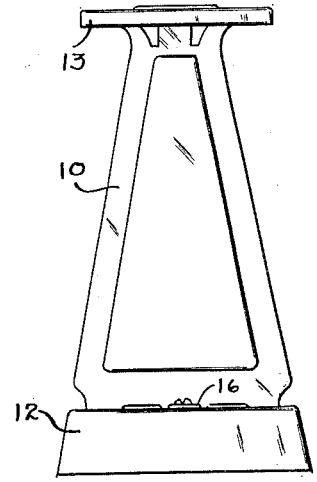
Figure 3:
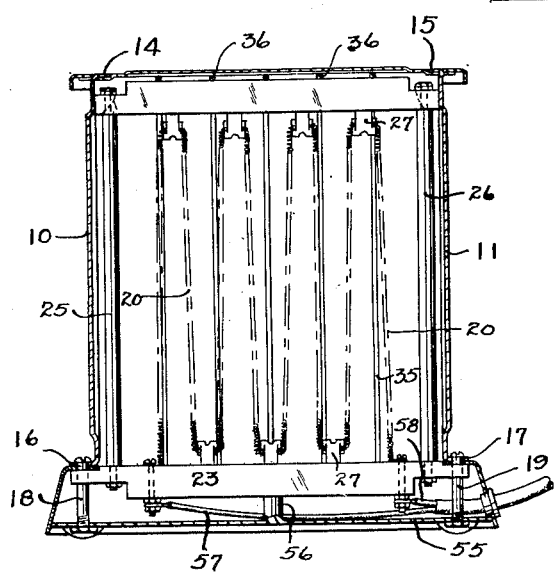
Figure 9:
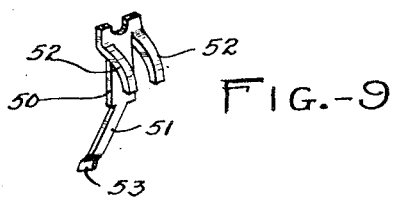
Figure 4:
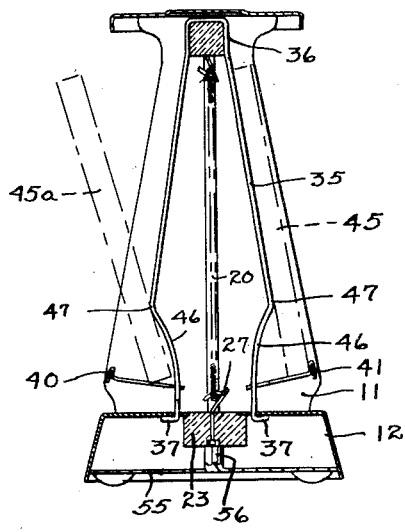
Figure 8:
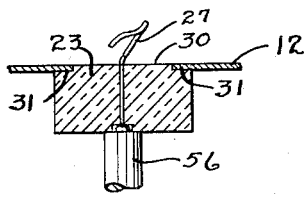
Figure 5:
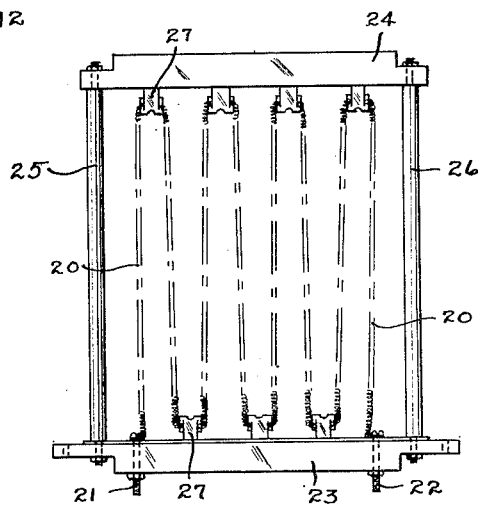
Figure 6:
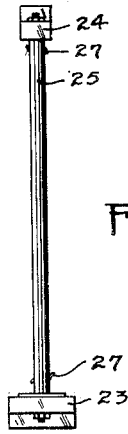
Figure 7:
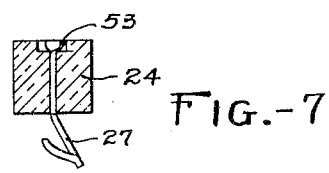

The preferred means for carrying out my invention is illustrated in the drawings, wherein Fig. 1 is a perspective view of an electric toaster embodying my invention; Fig. 2 is an end elevation of the toaster; Fig. 3 is a longitudinal vertical section through the toaster; Fig. 4 is a transverse vertical section through the toaster; Fig. 5 is a side elevation of the assembled heating element apart from the toaster frame; Fig. 6 is an end elevation of the heating element as shown in Fig. 5; Figs. 7 and 8 are sectional details on an enlarged view showing the connection between the anchor posts and the element frame; and Fig. 9 is a perspective view of an anchor post apart from the frame.

My invention is shown in connection with a frame having end members 10 and 11 which are mounted upon a base 12 and are connected by a top member 13. The parts of the frame may comprise stampings of light sheet metal which are connected in a suitable manner. As shown, the frame members have tongues 14 and 15 respectively which engage the top member 13 and have legs 16 and 17 respectively, which are arranged to be attached to the base by securing members 18 and 19 respectively.

The heating element indicated in Fig. 5 embodies coiled wire 20 which is electrically connected to binding screws 21 and 22. The element frame is shown as a base member 23 and a top member 24 which comprise electrical insulating material, and which are arranged to be connected by bolts 25 and 26 respectively. Anchor posts indicated at 27 serve to position the element with reference to the element frame.

The element as heretofore stated can be assembled independently of the toaster frame and then inserted as a unit into the toaster frame. To this end the base 12 has a longitudinally extending recess 30 through which the element frame may be inserted. The bottom member 23 may have shoulders 31 which fit into the recess and bring the top of the member 23 flush with the top of the base member 12 as shown particularly in Fig. 8. The top member 24 of the element frame is positioned by the bread rack as indicated in Fig. 4. This bread rack in the preferred form comprises a plurality of wires 35 each of which is bowed intermediately as at 36 to receive the element frame. The ends 37 of the wires are fastened to the base 12, preferably by clinching the ends in any suitable manner.

Adjacent the bottom of the bread rack I provide shelves 40 and 41 which function as bread rests. These shelves are preferably rigidly mounted on the toaster frame and are slightly inclined outwardly and upwardly so that bread resting thereon will lie flat against the associated racks as indicated by the broken lines 45 in Fig. 4.

To permit the reversing operation of bread, I provide a space between the shelf and the lowermost edge of the rack in contact with the bread. In the preferred form the space is provided by making an offset in the rack such as by bending the rack wires inwardly and adjacent the bottom thereof as indicated at 46. This leaves a portion of the rack out of contact with the bread and provides a pivot 47 about which the bread may be swung to effect the reversing movement. The ease with which the bread may be reversed is illustrated in Fig. 4 wherein the lower end of the bread indicated at 45ᵃ is pressed inwardly toward the rack until the center of gravity of the bread moves outwardly beyond the vertical position. This causes the bread to fall outwardly and into the hand of the operator where it may be readily turned to bring the cool side against the rack.

The anchor post indicated in general at 27 is shown in perspective in Fig. 9 and comprises a body 50 having a shank 51 which extends through a slot in the element frame members. Prongs 52 stamped from the body portion cooperate therewith to provide a support for the wire loops as indicated in Fig. 4. The posts may be firmly positioned within the respective insulating members by twisting the ends 53 of each shank as illustrated in Figs. 7 and 8 respectively.

After the element frame is inserted within the toaster frame, then the securing members 18 and 19 which function to hold the toaster frame in assembled position may also function to lock the element frame to the toaster frame. This I accomplish by employing a cover plate 55 as indicated in Fig. 3 which is mounted beneath the base 12 and has a centrally located post 56 which presses upwardly against the bottom member of the element frame when the securing members are tightened. The space between the cover plate 55 and the element frame may be used for housing the lead wires 57 and 58 respectively.

From the foregoing description it will be evident that I have provided an electric toaster which is so constructed that the bread may be quickly and easily reversed without necessitating the use of pivot doors and connecting links, wherefore the cost of manufacture, particularly the assembly operation may be materially reduced. In addition I have provided an element frame which may be assembled independently of the toaster frame and inserted thereon as a unit. The advantages of this arrangement are apparent not only to facilitate the manufacture, but also the replacement of a defective heating element.

I claim:

1. In a device of the character described, the combination with a frame having a base, upright end members and a top, a heating element extending from the top to the base and substantially from one end member to the other, a bread rack extending from the top to the base and having an offset near the base, a bread rest extending outwardly from the rack above the base, the offset being sufficiently recessed toward the element that bread supported on the rest may be tipped outwardly when the bottom inner edge of the bread is forced inwardly until it engages the offset portion of said rack.

2. In a device of the character described the combination with a frame, of a heating element carried thereby, a bread rack disposed adjacent the element and extending from top to bottom of the frame and a bread rest adjacent the bottom of the rack, there being an offset in the rack whereby bread placed on the rest may be tipped with reference to the rack for reversing purposes whenever the bottom portion of the bread is forced inwardly until the inner bottom edge engages the offset portion of the rack.

3. In an electric toaster the combination with a frame, of a heating element carried thereby, a rack carried by the frame adjacent the element and extending from top to bottom of the frame, a bread rest near the bottom of the rack and associated with the frame, the rack having an offset portion extending substantially the entire length of the rest, said offset portion extending sufficiently far toward the heating element that bread positioned upon the rest and engaging the rack may be swung outwardly and away from the rack when inward pressure is exerted upon the bread in the offset region of the rack.

4. In an electric toaster the combination with a toaster frame, of a heating element carried thereby, a bread rack also carried by the frame and spaced from the element, the bread rack extending substantially entirely across the frame and having an inwardly extending off-set portion arranged to be out of contact with the bread, the off-set portion being disposed near the bottom of the bread and being spaced sufficiently near the element that inward pressure exerted on the bread near the bottom thereof causes the center of gravity of the bread to pass outwardly beyond the vertical whereupon the bread is caused to fall away from the rack.

In testimony whereof, I hereunto affix my signature.

ERNEST B. ZIMMER.